(12) United States Patent
Cho

(10) Patent No.: US 10,197,273 B2
(45) Date of Patent: Feb. 5, 2019

(54) SMOKE PROCESSING DEVICE

(71) Applicant: Young Ja Cho, Daegu (KR)

(72) Inventor: Young Ja Cho, Daegu (KR)

( * ) Notice: Subject to any disclaimer, the term of this patent is extended or adjusted under 35 U.S.C. 154(b) by 187 days.

(21) Appl. No.: 15/307,014

(22) PCT Filed: Apr. 8, 2015

(86) PCT No.: PCT/KR2015/003497
§ 371 (c)(1),
(2) Date: Oct. 27, 2016

(87) PCT Pub. No.: WO2015/167137
PCT Pub. Date: Nov. 5, 2015

(65) Prior Publication Data
US 2017/0051915 A1     Feb. 23, 2017

(30) Foreign Application Priority Data

Apr. 28, 2014 (KR) .................. 10-2014-0050523
Jul. 16, 2014 (KR) .................. 10-2014-0089467

(51) Int. Cl.
| | |
|---|---|
| *A61L 9/00* | (2006.01) |
| *B01D 53/02* | (2006.01) |
| *B01D 39/00* | (2006.01) |
| *F23J 15/02* | (2006.01) |
| *F23J 15/08* | (2006.01) |
| *B01D 53/34* | (2006.01) |

(Continued)

(52) U.S. Cl.
CPC ............ *F23J 15/02* (2013.01); *B01D 53/346* (2013.01); *B01D 53/86* (2013.01); *F23G 7/07* (2013.01); *F23J 15/08* (2013.01); *F23J 2219/10* (2013.01)

(58) Field of Classification Search
CPC .......... A61L 9/22; A61L 9/046; B01D 53/06; B01D 53/0438; F24F 11/89
USPC .......... 422/307; 96/108, 225; 454/187, 228, 454/357
See application file for complete search history.

(56) References Cited

FOREIGN PATENT DOCUMENTS

| JP | 2000-254011 A | 9/2000 | |
|---|---|---|---|
| JP | 2000254011 A | * 9/2000 | .............. A47J 37/06 |

(Continued)

OTHER PUBLICATIONS

European Patent Office Machine English Translation of the Description section and the Claims section of JP 2000254011 A.*

(Continued)

*Primary Examiner* — Monzer R Chorbaji
(74) *Attorney, Agent, or Firm* — Hauptman Ham, LLP

(57) ABSTRACT

The present disclosure relates to a smoke processing device for processing smoke, which is generated by an indoor industrial site, a restaurant, or a heating means that applies heat and generates smoke, the device including at least: a smoke purification means comprising a smoke collector equipped with a smoke movement duct, the smoke movement duct comprising a smoke purifier for purifying smoke, which has been collected by the smoke collector, and discharging the purified smoke, the smoke purification means comprising a hot air movement duct for moving the smoke purified and discharged by the smoke purifier; and a heat exchange means installed on the smoke movement duct to promote heat exchange of smoke collected by the smoke collector such that the smoke is converted to high-temperature smoke and is moved to the smoke purifier.

2 Claims, 6 Drawing Sheets

(51) Int. Cl.
  *B01D 53/86* (2006.01)
  *F23G 7/07* (2006.01)

(56) References Cited

FOREIGN PATENT DOCUMENTS

| | | |
|---|---|---|
| JP | 2001-116458 A | 4/2001 |
| JP | 2013-015243 A | 1/2013 |

OTHER PUBLICATIONS

International Search Report dated Jun. 18, 2015 corresponding to International Application PCT/KR2015/003497 citing the above reference(s).

\* cited by examiner

SMOKE PROCESSING DEVICE

CROSS REFERENCE TO RELATED APPLICATION

This application claims the priority of Korean Patent Application Nos. 10-2014-0050523, filed on Apr. 28, 2014, and 10-2014-0089467, filed on Jul. 16, 2014, in the KIPO (Korean Intellectual Property Office). Further, this application is the National Phase application of International Application No. PCT/KR2015/003497 filed Apr. 8, 2015, which designates the United States and was published in Korean.

TECHNICAL FIELD

The present invention relates to a smoke processing device capable of processing smoke, which is generated in an indoor industrial site, a restaurant and the like, with speed and, more particularly, to a smoke processing device, in which a heat exchange means is installed on a smoke movement duct, through which smoke generated in an indoor industrial site, a restaurant, or a heating means that applies heat and generate smoke is collected and moved, and converts the smoke collected by a smoke collector into high-temperature smoke such that the high-temperature smoke is supplied to a smoke purifier and catalysis is smoothly carried out in the smoke purifier by a catalyst provided to the inside of the smoke purifier, thereby efficiency purifying and processing the smoke.

BACKGROUND ART

Smoke is a collection of airborne solid and liquid particulates generated when a combustible material undergoes combustion and particularly generated at lot during operations in an indoor industrial site or when roasting meats.

The smoke includes a lot amount of fine dust, which is harmful to a human body, during the combustion of a material and this fine dust is collected in the nose of a worker, resulting in the decrease of health and working environment. Also, the smoke in restaurants permeates the clothing and the like together with unpleasant oil flavor, decreasing the taste.

In order to remove the smoke, a dust collector has been used but the dust collector has a disadvantage in the removal of the smoke which is released in a large amount in the initial combustion stage.

DISCLOSURE

Technical Problem

Accordingly, the present invention has been made in an effort to solve the above-mentioned problems occurring in the prior art, and it is an objective of the present invention to provide a smoke processing device for efficiently purifying and processing smoke, in which a heat exchange means is installed on a smoke movement duct, through which smoke generated in an indoor industrial site, a restaurant, or a heating means that applies heat and generate smoke is collected and moved, and converts the smoke collected by a smoke collector into high-temperature smoke such that the high-temperature smoke is supplied to a smoke purifier and catalysis is smoothly carried out by a catalyst provided to the inside of the smoke purifier.

Technical Solution

According to one aspect of the present invention to achieve the above objective, there is provided a smoke processing device for processing smoke, which is generated by an indoor industrial site, a restaurant, or a heating means that applies heat and generates smoke, comprising: a smoke purification means, including a smoke collector provided with a smoke movement duct, through which the smoke generated by the indoor industrial site, the restaurant, or the heating means that applies heat and generates smoke can flow, a smoke purifier provided to the smoke movement duct of the smoke collector so as to purify the smoke collected by the smoke collector and discharge the purified smoke, and a hot air movement duct, through which the smoke purified and discharged by the smoke purifier flows; and a heat exchange means installed on the smoke movement duct of the smoke purification means so as to promote heat exchange of the smoke collected by the smoke collector such that the smoke is converted into high-temperature smoke and is moved to the smoke purifier.

Advantageous Effects

As described hereinabove, according to the present invention, the heat exchange means is installed on the smoke movement duct and converts the smoke collected by the smoke collector into the high-temperature smoke so as to supply the high-temperature smoke to the smoke purifier such that catalysis is smoothly carried out in the smoke purifier by a catalyst provided to the inside of the smoke purifier and thus the smoke can be efficiency purified.

Figure 1:
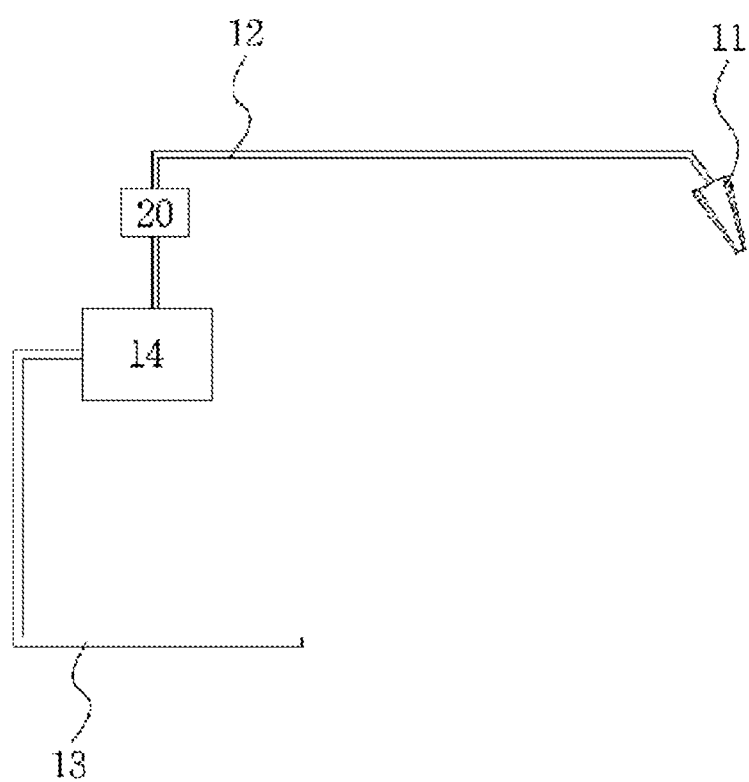
FIGS. 1, 2 and 3 are views for illustrating a smoke processing device according to preferred embodiments of the present invention.

| [Explanation of essential reference numerals in drawings] | |
|---|---|
| 11: a smoke collector | 12: smoke movement duct |
| 13: hot air movement duct | 14: smoke purifier |
| 15: main body | 16: smoke purification body |
| 17: case | 18: container |
| 20: heat exchange means | 31: first temperature sensor |
| 33: first control means | 41: second temperature sensor |
| 43: dual-shaped pipe | |
| 44: first valve | |
| 45: second valve | 47: second control means |
| 49: supply pipe | |

MODE FOR INVENTION

Hereinafter, preferred embodiments of the present invention will be described in detail with reference to the accompanying drawings.

A smoke processing device according to the present invention is provided to process smoke, which is generated in an indoor industrial site, a restaurant or a heating means that applies heat and generate smoke.

To this end, as shown in FIG. 1, an indoor industrial site, a restaurant or a heating means that applies heat and generates smoke includes a smoke purification means in order to remove smoke which is unavoidably generated in such a place.

The smoke purification means includes a smoke collector (11) provided with a smoke movement duct (12), through which smoke generated by the indoor industrial site, the restaurant, or the heating means that applies heat and generates smoke can flow.

The smoke purification means includes a smoke purifier (14) installed on the smoke movement duct (12) so as to purify the smoke collected by the smoke collector (11) and discharge the purified smoke, wherein a catalyst is provided to the inside of the smoke purifier 14, which is installed on the smoke movement duct, so as to purify the smoke through catalysis with speed and it is preferable to use platinum catalyst as such a catalyst.

The smoke purification means includes a hot air movement duct (13), through which the smoke purified and discharged by the smoke purifier (14) flows. Since the smoke moving through the hot air movement duct is high-temperature smoke, this smoke may be moved to a place as desired so as to be reused.

According to the present invention, the smoke processing device further includes a heat exchange means (20) installed on the smoke movement duct (12) so as to promote heat exchange of the smoke collected by the smoke collector (11) such that the smoke is converted into high-temperature smoke and moved to the smoke purifier (14).

Therefore, since the smoke moving through the smoke movement duct (12) is converted into the high-temperature smoke and thus converted high-temperature smoke is supplied to the smoke purifier (14) by the heat exchange means (20), catalysis is smoothly carried out by the catalyst in the smoke purifier (14) such that the smoke is purified with speed.

Herein, it is preferable that the heat exchange means (20) is to be any one of a heat exchanger, a heater or a hot wire, wherein the hot wire is preferably wound on the outside of the smoke collector (1).

Meanwhile, the temperature of the smoke, of which heat is carried out by the heat exchange means (20), is maintained at 200~300° C. such that the catalysis by the catalyst is carried out with speed, purifying the smoke.

However, if the temperature of the smoke, which is collected by the smoke collector (11) and introduced into the smoke purifier (14), is maintained in the range of 200~300° C., the smoke collected by the smoke collector (11) is directly moved to the smoke purifier (14) regardless of the heat exchange means (20), such that the catalysis is carried out by the catalyst.

To this end, the present invention may be configured according to first and second embodiments.

Figure 2:
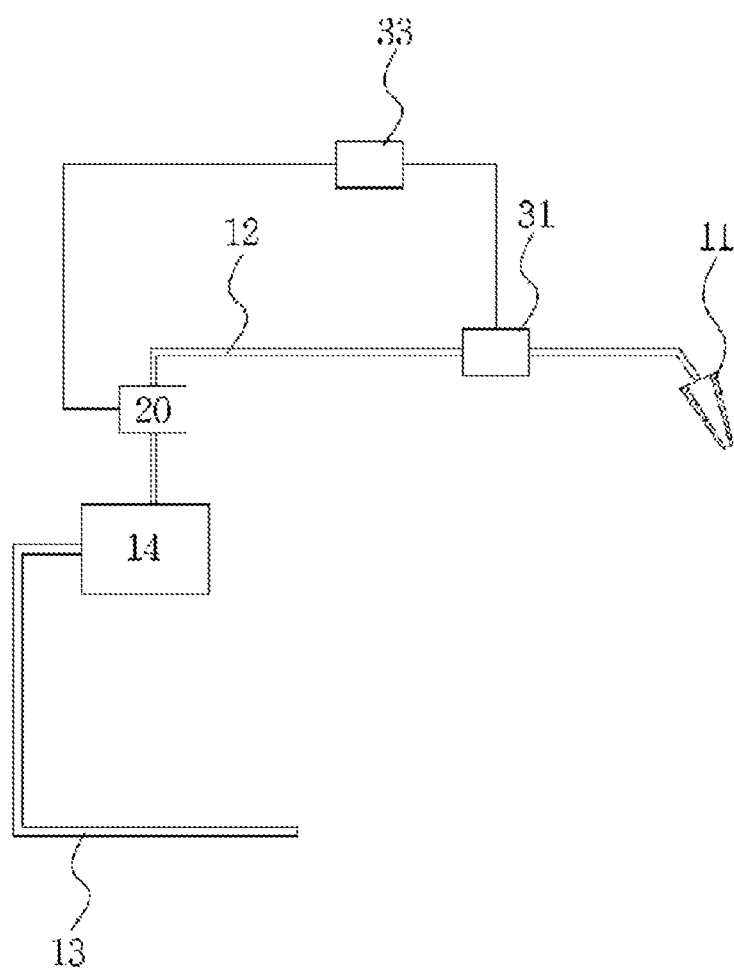

A smoke processing device according to the first embodiment, as shown in FIG. 2, includes a first temperature sensor (31) provided to the smoke movement duct (12) so as to measure and sense the internal temperature of the smoke movement duct (12) and a first control means (33) for controlling the operation of the heat exchange means (20) according to the internal temperature of the smoke movement duct (12), which is sensed by the first temperature sensor (31).

That is, in the case where the temperature of the smoke, which is collected by the smoke collector (11) and moves through the smoke movement duct (12), is 200° C. or higher, then the first control means (33) blocks the operation of the heat exchange means (20) such that the smoke collected by the smoke collector (11) is directly moved to the smoke purifier (14) so as to be purified, and in the case where the temperature of the smoke, which is collected by the smoke collector (11) and moves through the smoke movement duct (12), is lower than 200° C., then the first control means 33 controls the heat exchange means (20) to operate such that the temperature of the smoke is increased up to 200° C. or higher through the heat exchange carried out by the heat exchange means 20 and then the collected smoke moves through the smoke purifier 14.

Figure 3:
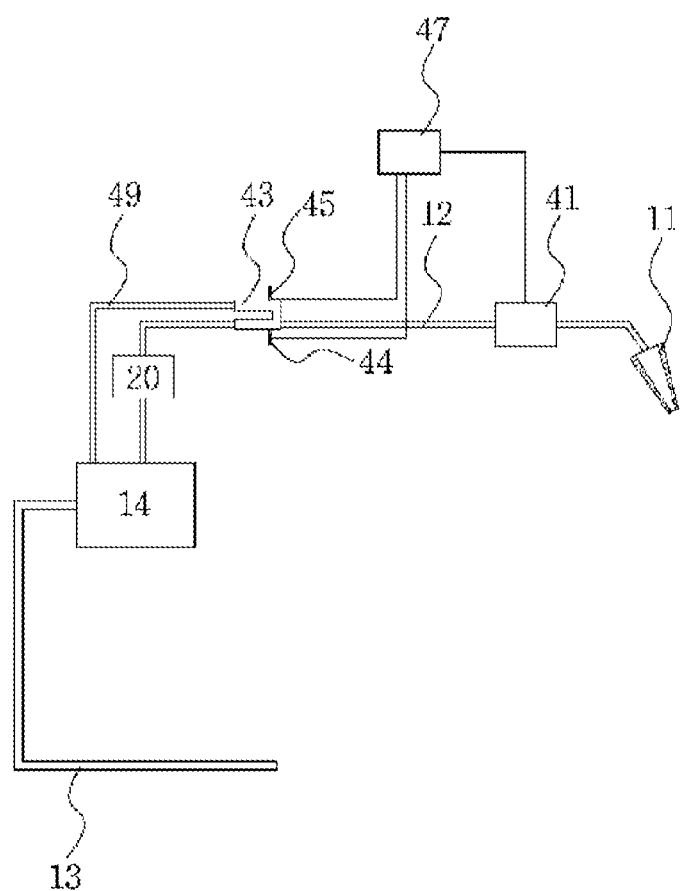

A smoke processing device according to the second embodiment, as shown in FIG. 3, includes a second temperature sensor (41) provided to the smoke movement duct (12) so as to measure and sense the internal temperature of the smoke movement duct (12), a dual-shaped pipe (43), which is connected to the smoke movement duct (12), first and second valves (44, 45) for respectively opening and closing the dual-shaped pipe (43), a second control means (47) for controlling the operations of the first and second valves (44, 45) according to the temperature sensed by the second temperature sensor (41), and a supply pipe (49), of which one side is connected to the dual-shaped pipe (43) and the other side is connected to the rear side of the smoke movement duct (12) such that the collected smoke collected by the dual-shaped pipe (43) does not pass the heat exchange means (20).

Further, one of the dual-shaped pipe (43), which is provided with the first valve (44), is connected to the smoke movement duct (12), through which the smoke moves to the heat exchange means (20), and the other one of the dual-shaped pipe (43), which is provided with the second valve (45), is connected to an additional supply pipe (49).

That is, when the temperature of the smoke, which is collected by the smoke collector (11) and moves to through the smoke movement duct (12), is 250° C. or higher, then the second control means (47) opens the second valve (45) while closing the first valve (44) and thus the smoke collected by the smoke collector (11) arrives at the smoke purifier (14) by passing through the supply pipe (49) and the smoke movement duct (12) in sequence such that the catalysis is carried out.

Further, when the temperature of the smoke, which is collected by the smoke collector (11) and moves to through the smoke movement duct (12), is lower than 250° C., the second control means (47) opens the first valve (44) while closing the second valve (45) and thus the smoke collected by the smoke collector (11) moves through the smoke movement duct (12) to the heat exchange means (20) and then arrives at the smoke purifier (14) after being converted into high-temperature smoke by the heat exchange means (20) such that the catalysis is carried out.

Therefore, according to the configuration of the first and second embodiments, the smoke collected by the smoke collector 11 can be immediately used while the continuous operation of the heat exchange means (20) is blocked, thereby improving efficiency.

Figure 4:
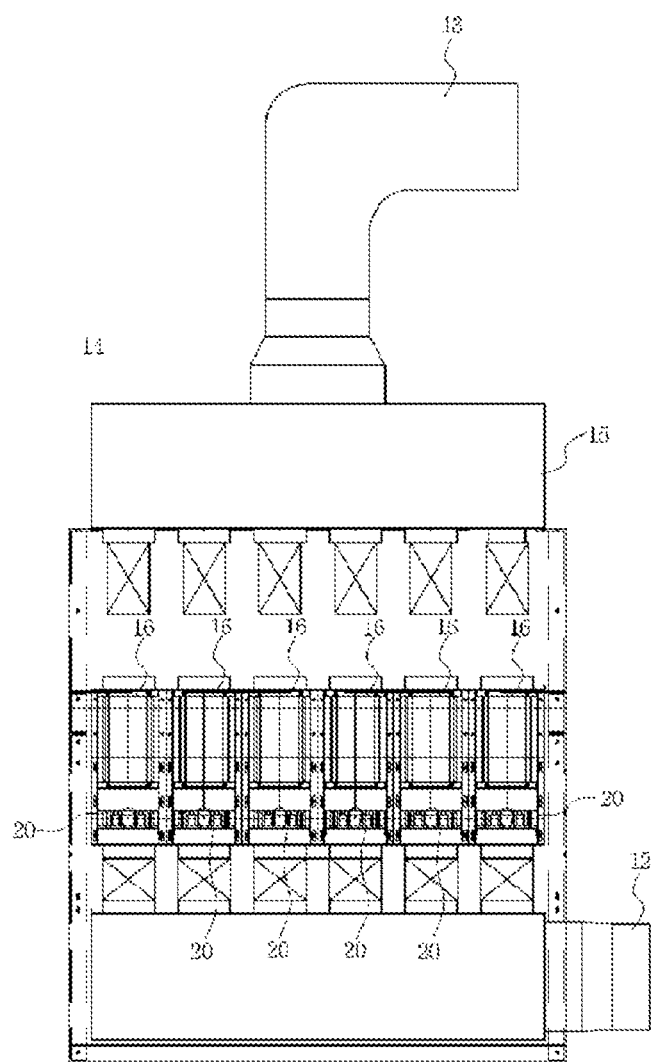
FIGS. 4, 5 and 6 are views for illustrating a smoke purifier according to preferred embodiments of the present invention.
Figure 5:
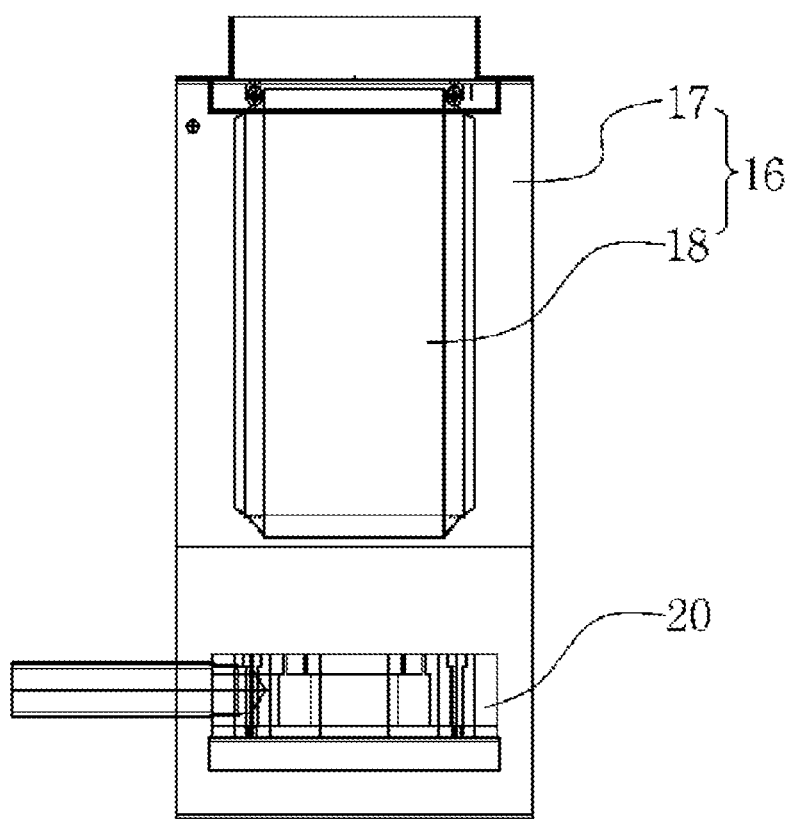
Figure 6:
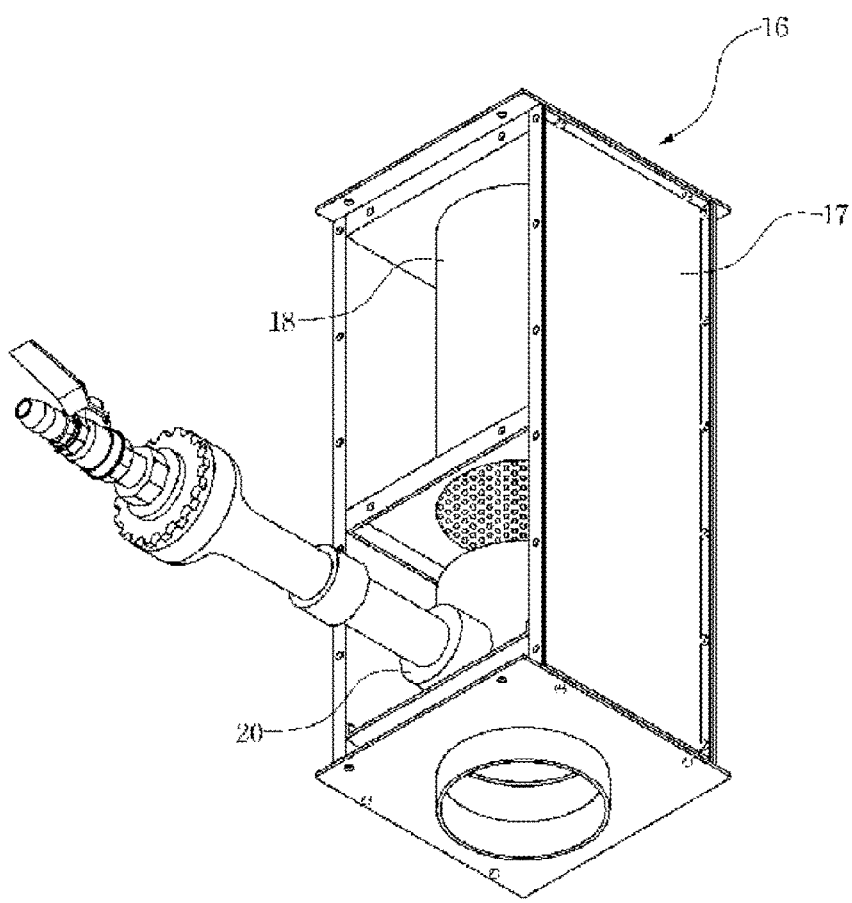

Herein, the detailed structure of the smoke purifier (14) is shown in FIG. 4 to FIG. 6. Referring to FIG. 4 to FIG. 6, the smoke purifier (14) includes a main body 15 having one side, through which the smoke collected by the smoke collector (11) is introduced, and the other side, to which the hot air movement duct (12) is connected.

The main body 15 of the smoke purifier 14 includes a smoke purification body 16 therein, and the smoke purification body 16 has a case (17), which is divided into an upper part and a lower part respectively such that the smoke to be introduce into the main body 15 is introduced into and discharged from the case 17, and a container (18), which is provided to the upper part divided in the case (17) and has a sealed space, into which the smoke introduced from the smoke collector (11) is introduced so as to be collected. There are at least one or more smoke purification bodies (16) installed in the main body 15.

Further, the heat exchange means (20) has a burner for transmitting high-temperature heat directly to the container (18) at the lower side divided in the main body (15).

The container 18 is provided with a catalyst therein so as to purify the smoke through catalysis with speed and it is preferable to use platinum catalyst as such a catalyst.

Therefore, the smoke flowing through the smoke movement duct 12 is converted into the high-temperature smoke by the heat exchange means (20), which supplies heat to the smoke purifier 14 and, simultaneously the catalysis is smoothly carried out by the catalyst provided to the inside of the smoke purifier 14, such that the smoke can be purified with speed.

The invention claimed is:

1. A smoke processing device for processing smoke, comprising:
    a smoke purification means including
        a smoke collector provided with a smoke movement duct to provide a flow of the smoke therethrough,
        a smoke purifier connected with an outlet of the smoke movement duct and configured to purify the smoke collected by the smoke collector and discharge the purified smoke, and
        a hot air movement duct connected with the smoke purifier to pass a flow of the purified smoke therethrough; and
    a heat exchange means installed on the smoke purifier, and configured to heat the collected smoke up to a predetermined temperature so that the heated smoke is moved to the hot air movement duct,
    wherein the smoke purifier has an one side connected with the smoke movement duct and the other side connected with the hot air movement duct,
    wherein the smoke purifier includes a plurality of smoke purification bodies, each of the plurality of smoke purification bodies including
        a case having an upper part and a lower part, and
        a container provided to the upper part of the case and having a catalyst therein, wherein the collected smoke is introduced into the container, and
    wherein
        the heat exchange means comprise a plurality of burners, and
        each of the plurality of burners is installed on a lower part of corresponding case of the plurality of smoke purification bodies, and is configured to heat corresponding container of the plurality of smoke purification bodies so that the collected smoke in the corresponding container is heated up to a predetermined temperature.

2. The smoke processing device according to claim 1, further comprising:
    a temperature sensor provided to the smoke movement duct, and configured to measure internal temperature of the smoke movement duct; and
    a control means connected with the temperature sensor and the heat exchange means, and configured to control an operation of the heat exchange means according to the internal temperature of the smoke movement duct.

* * * * *